UNITED STATES PATENT OFFICE.

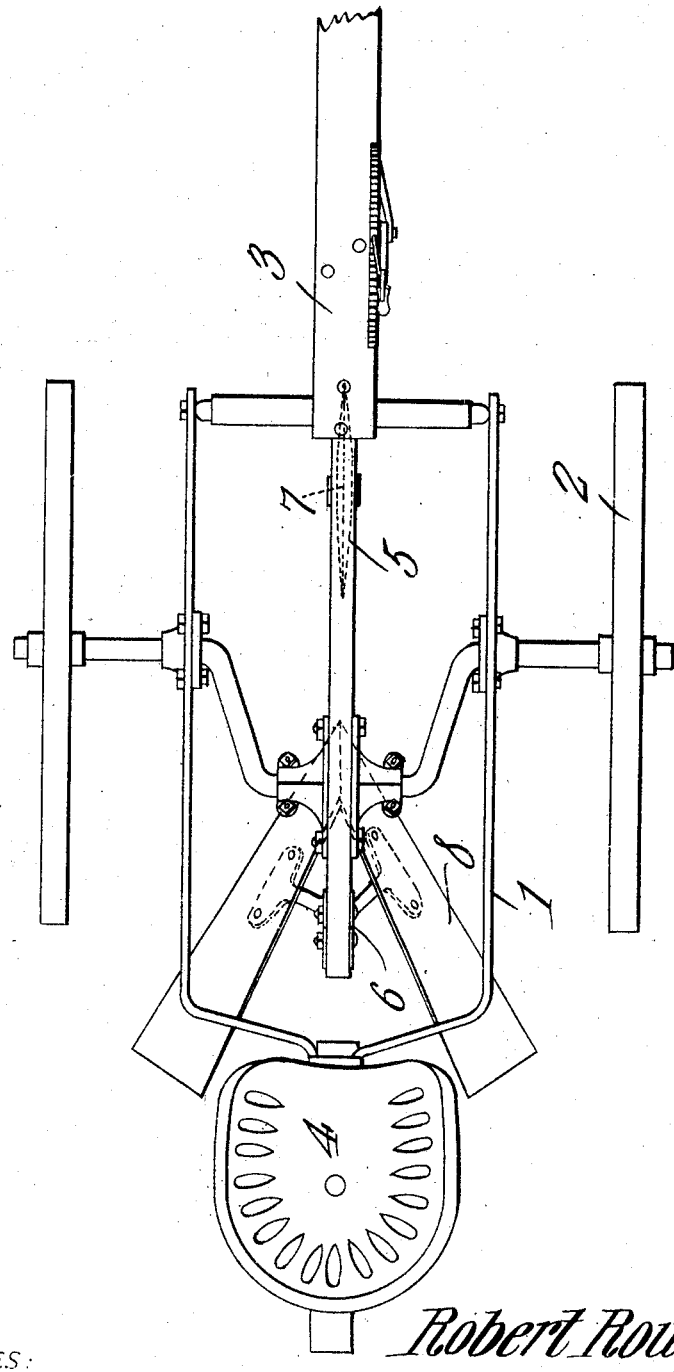

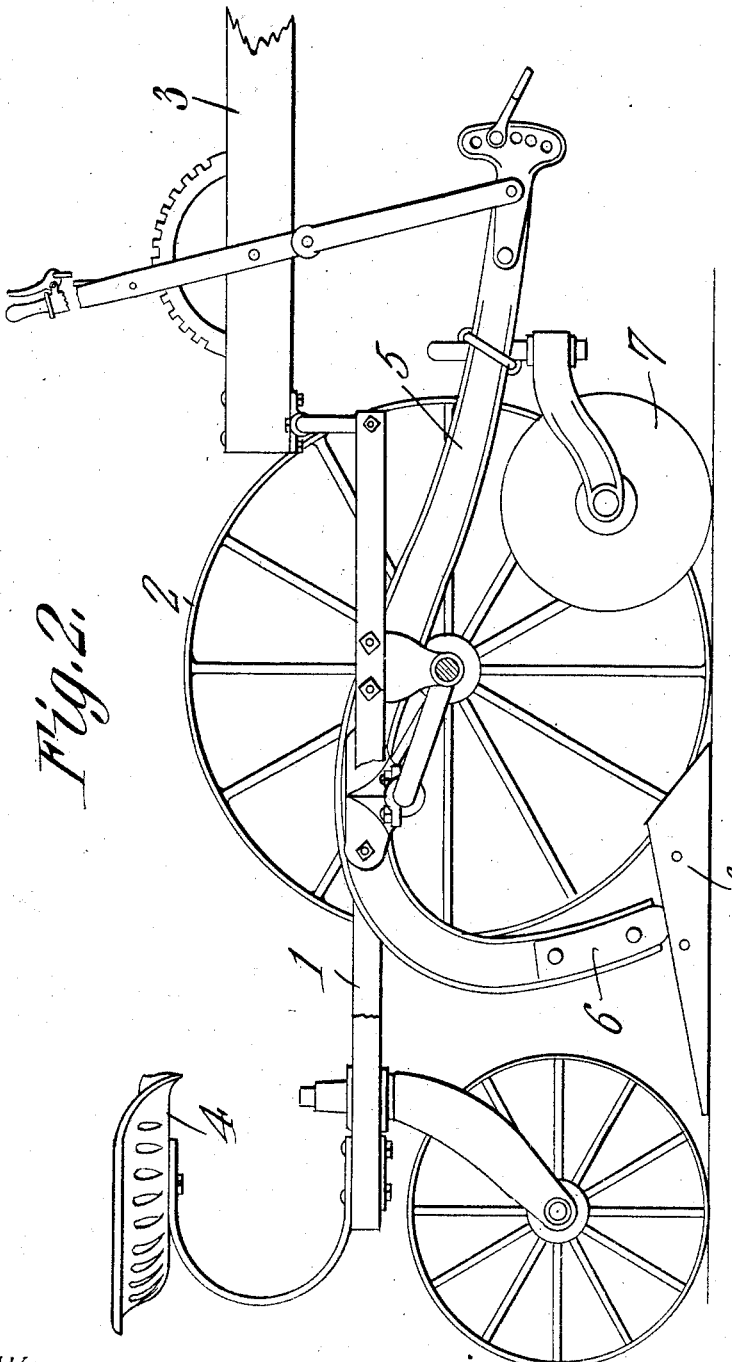

ROBERT ROUNDS, OF HENNESSEY, OKLAHOMA.

COW-PEA CUTTER.

No. 879,324.  Specification of Letters Patent.  Patented Feb. 18, 1908.

Application filed May 29, 1907. Serial No. 376,328.

*To all whom it may concern:*

Be it known that I, ROBERT ROUNDS, a citizen of the United States, residing at Hennessey, in the county of Kingfisher and State of Oklahoma, have invented a new and useful Cow-Pea Cutter, of which the following is a specification.

This invention has relation to cow pea cutters and it consists in the novel construction and arrangement of its parts as hereinafter shown and described.

The object of the invention is to provide an effective cutter for cow peas and similar crawling vines.

The cutter is provided with a blade of peculiar configuration which operates slightly below the surface of the ground and severs the stalk of the vine from the root thereof. The said blade is mounted upon a standard and a vertically disposed cutter is located in advance of the standard in order to cut the vine so that they may not drag with the standard.

In the accompanying drawing:—Figure 1 is a top plan view of the cutter, Fig. 2 is a side elevation of the same with parts removed. Fig. 3 is a front elevation of a blade used upon the cutter, and Fig. 4 is a rear elevation of said blade.

The general framework of the cutter may be of any desired pattern but the frame herein illustrated is represented by 1 and which is mounted upon the ground wheels 2. The tongue 3 is attached to the forward part of the frame and the operator's seat 4 is mounted upon the rear portion of the frame. The beam 5 is attached to the frame and the standard 6 is attached to the said beam. The vertically disposed disk cutter 7 is attached to the beam 5 in advance of the standard 6. The standard 6 carries a blade of peculiar configuration. The said blade is substantially V-shaped in plan and is represented at 8 in the drawing. The apex of the blade 8 is located in advance of the standard 6 and immediately behind the disk 7. The forward edge of the blade is sharpened and lies in a horizontal plane while the rear edge of the blade lies in an inclined plane which intersects the plane of the front edge at the rear end portions of the blade. Thus the rear ends of the blade are horizontal while the intermediate forward portion thereof gradually assumes anticlinal relation. The formation of the blade 8, as above described, permits of the ready attachment of the standard 6 to the side portions of the blade and at the same time the blade is of such shape that it will operate below the surface of the soil and in the vicinity thereof so that the stalks of the plant are severed from the roots thereof. At the same time, those plants that are cut by the intermediate portion of the blade are cast aside for a short distance in order to permit the standard 6 to move unobstructed through the cleft, while those plants that are cut by the end portions of the blade remain substantially in the same places that they occupy before being severed.

The advantages gained by this implement over implements that operate upon the vines above the surface of the ground are that the blade will cut all of the vines whether they be in furrows or ridges, thus, the entire crop may be harvested and the cutting is accomplished with less strain upon the draft animals for the reason that the vines cannot become entangled in the cutting mechanism and in as much as the cutting operation occurs below the surface of the ground the soil in a measure braces the cutting blade against its work.

Having described my invention what I claim as new and desire to secure by Letters-Patent is:—

1. In an implement for cutting crawling vines, a blade having a cutting edge lying in one plane and another edge lying in an intersecting plane, the point of intersection of the two planes occurring at the end portions of the blade.

2. In an implement for cutting crawling vines, a V-shaped blade having a cutting edge lying in one plane and another edge lying in an intersecting plane, the point of intersection of the two planes occurring at the end portions of the blade.

3. In an implement for cutting crawling vines, a V-shaped blade having its end portions horizontal with its intermediate portions gradually formed into anticlinal relation.

4. In an implement for cutting crawling vines, a V-shaped blade, a standard supporting the blade and being located in the rear of the apex thereof, said blade having its end portions horizontal and its intermediate portions gradually formed into anticlinal relation and a vertically disposed cutter located in advance of the apex of the blade.

In testimony that I claim the foregoing as my own, I have hereto affixed my signature in the presence of two witnesses.

ROBERT ROUNDS.

Witnesses:
  E. B. COCKRELL,
  W. A. RHODES.